No. 883,763. PATENTED APR. 7, 1908.
J. E. TOURTELLOTTE.
TIRE FOR VEHICLE WHEELS.
APPLICATION FILED MAY 28, 1906.
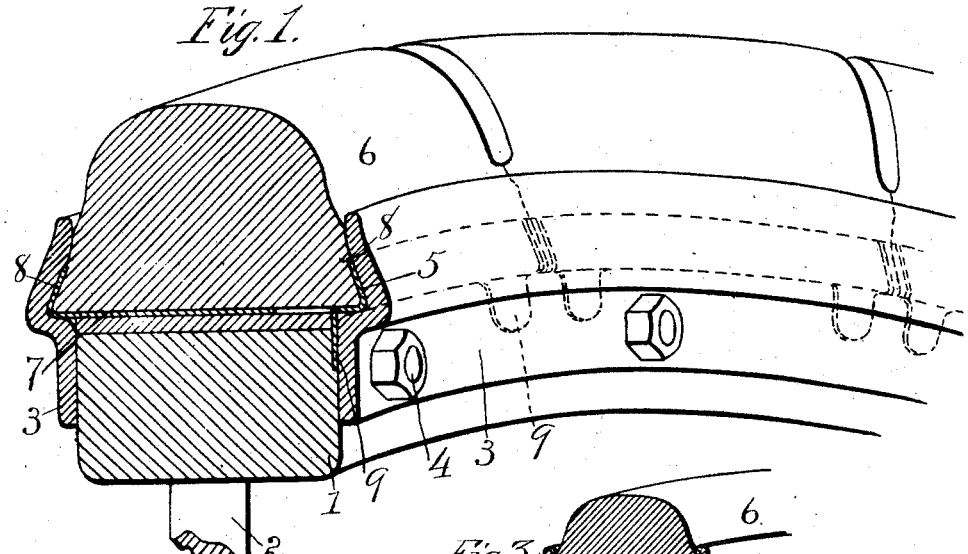
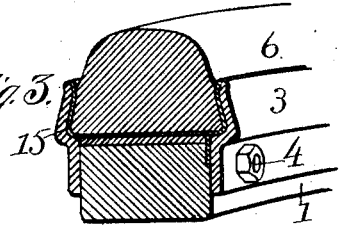
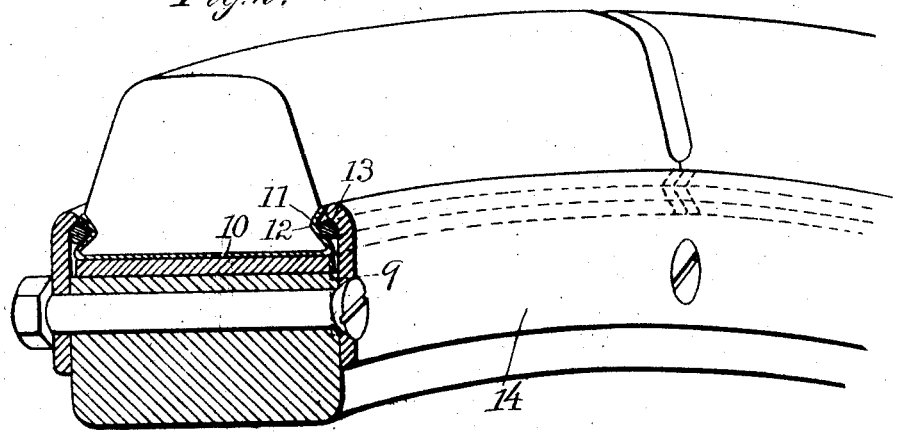
Witnesses:
F. H. Elliott
L. S. Berkwitch
Inventor:
James E. Tourtellotte
by Arthur B. Jenkins
Attorney

UNITED STATES PATENT OFFICE.

JAMES E. TOURTELLOTTE, OF HARTFORD, CONNECTICUT.

TIRE FOR VEHICLE-WHEELS.

No. 883,763.  Specification of Letters Patent.  Patented April 7, 1908.

Application filed May 28, 1906. Serial No. 318,997.

*To all whom it may concern:*

Be it known that I, JAMES E. TOURTELLOTTE, a citizen of the United States, and a resident of Hartford, in the county of Hartford and State of Connecticut, have invented a new and Improved Tire for Vehicle-Wheels, of which the following is a specification.

My invention relates more especially to the class of tires used upon heavy vehicles and commonly known as "solid" tires as distinguished from pneumatic tires.

The object of my invention is to so secure a tire of this class in place as to prolong its life; and a further object of the invention is to provide such a tire with means whereby it may be applied to wheels of varying dimensions in diameter.

A form of device in the use of which these objects may be attained is illustrated in the accompanying drawings, in which—

Figure 1 is a perspective view in cross-section showing a portion of the rim and tire of a wheel embodying my invention. Fig. 2 is a like view showing a modified form of the invention. Fig. 3 is a detail view, scale reduced, showing a slightly modified form of the invention.

In order to secure the full benefits of the resiliency of the rubber in use, and at the same time to provide for the maximum use of the tire in extent of time, it is desirable that as little compression as possible shall be put upon the tire in order to secure it in place. In order to accomplish this result in prior devices resort is made to holding means which are made more or less a part of the tire, either being vulcanized into the substance of the rubber composing the tire, or projecting into recesses in the surface of the rubber tire. Such devices, however, are faulty owing to the fact that under compression a grinding action between the parts results, causing disintegration of the tire and also imperfect holding means. I have provided means whereby such a tire may be firmly held in place without the introduction of foreign elements to cause early disintegration of the tire.

In the accompanying drawings the numeral 1 denotes the rim of a wheel that may be of ordinary form and construction, having, of course, the usual spokes as 2 and other parts essential to wheel construction.

The numeral 3 denotes clamping strips which are secured to the wood rim or felly 1 as by means of bolts 4 or other suitable fastening means. These clamping strips may be made in sections or in a continuous piece, as desired, and are undercut as at 5 forming a recess within which the flange of the rubber tire 6 engages.

In carrying out my invention I provide a reinforce 7 which may consist of metal of any desired kind, preferably steel or other material which is practically firm and unyielding. The tire 6 is vulcanized to this reinforcing strip so that the two form practically an integral mass. This strip may include lips 8 to partially embrace the sides of the tire if desired, these lips taking the pressure of the clamping strips 3. From this construction it will be noted that the full effects due to the resiliency of the rubber may be obtained, the tire being firmly held by the reinforcing strip, and it is therefore allowed full freedom to exert its resilient qualities throughout its entire depth.

The tire 6 may be composed of a continuous strip, common to many tires of this class, or it may be made in sections as shown in the drawings. These sections may be of any desired length. Whether the tire be formed of a continuous piece or in sections, the re-inforcing strip 7 is preferably made in sections, as indicated in dotted lines in the drawings. These sections are separated to a slight degree, as shown, a space being left between the ends so that the tire as a whole may be accommodated to wheels of slightly varying dimensions in diameter. When so constructed and with the tire in sections the ends of the latter project beyond the ends of the sections of the re-inforcing strips, abutting tightly against each other and insuring a pressure fit therebetween thus preventing foreign substances from working in between the joints. The tire may be of any desired shape in cross-section so long as the sides are formed to co-act with the clamping strips to force the tire tightly to its seat on the rim of the wheel to bind and hold it in place. As an additional means of holding the re-inforcing strip in place ears 9 may be stamped and turned down from the metal forming the strip and clamped between the clamping strips 3 and the rim of the wheel.

In the modified form of the invention shown in Fig. 2 the reinforcing strip 10 has the side lips 11 bent to form recesses 12 in which a clamping rod 13 may be placed, the clamping strip 14 being slightly overturned at their upper edges to overlie the clamping rod 13, as shown. In this construction, however, the tire is given full freedom to exert its resilient action.

An important feature of advantage of my improved tire resides in the fact that there are no foreign substances embedded in or protruding into the tire to grind and cut the rubber in its movement under pressure, but by vulcanizing and forming a reinforcing strip as a practically integral part of the tire, it is given full freedom and the full benefits are derived from the resiliency of the tire that under ordinary circumstances will allow an extended use before being worn out.

The lips formed at the sides of the reinforcing strip may be of any desired extent, extending for a slight distance along the side of the tire, as shown in Fig. 1, or these lips 15 may extend along the whole inner surface of the clamping strips 3, as shown in Fig. 3.

What I claim as my invention and desire to secure by Letters Patent is:—

1. A tire composed of elastic material and having sloping sides gradually tapering from the inner edge to a dimension of less width nearer the outer edge of the wheel, a reinforcing strip composed of practically unyielding material and having side parts conforming to and embracing the sides of said tire, the entire inner surface of said reinforcing strip being vulcanized to the tire, and means for securing said reinforcing strip to the rim of a wheel.

2. A tire composed of elastic material and having sloping sides gradually tapered from the inner edge to a dimension of less width nearer the outer edge thereof, a reinforcing member consisting of sections of non-elastic material and having side parts conforming to and embracing the side of said tire, and with a space between the ends of said strips, the entire inner surface of each of said strips being vulcanized to the tire, and means for securing said sections to a wheel rim.

3. A tire composed of elastic material formed in sections with the ends tightly abutting when in place upon a wheel rim and having sloping sides gradually tapered from the inner edge to a dimension of less width nearer the outer edge thereof, a reinforcing strip of non-elastic material formed in sections and arranged with a slight space between the ends thereof, said strip having side parts embracing and fitting said tire, the entire inner surface of said strip being vulcanized to the tire, and means for securing the sections of said strip to a wheel rim.

4. A wheel rim including a tire of elastic material, a reinforcing strip of non-elastic material adapted to receive said tire, said strip having integrally formed clips located between the wheel rim and a clamping strip, and clamping strips secured to said wheel rim and against said clips.

5. A wheel rim including a tire composed of rubber or like material, a reinforcing strip composed of practically unyielding material vulcanized to the outer surface of the rubber tire and having out-turned recessed lips, a clamping rod to be located in said recess, and a clamping strip secured to the sides of the rim and having a lip overlying said clamping rod.

JAMES E. TOURTELLOTTE.

Witnesses:
E. E. DAVIS,
CHAS. WARD.